United States Patent
Wiechmann

(10) Patent No.: US 11,813,137 B2
(45) Date of Patent: Nov. 14, 2023

(54) PROCESS TO PROGRAM AN ORTHODONTIC COMPONENT FROM A SHAPE MEMORY MATERIAL

(71) Applicant: Dirk Wiechmann, Bad Essen (DE)

(72) Inventor: Dirk Wiechmann, Bad Essen (DE)

( * ) Notice: Subject to any disclaimer, the term of this patent is extended or adjusted under 35 U.S.C. 154(b) by 0 days.

(21) Appl. No.: 17/529,573

(22) Filed: Nov. 18, 2021

(65) Prior Publication Data

US 2022/0151738 A1    May 19, 2022

(30) Foreign Application Priority Data

Nov. 19, 2020   (DE) .......................... 102020214587.3

(51) Int. Cl.
*A61C 7/20*    (2006.01)
*C22F 1/00*    (2006.01)

(52) U.S. Cl.
CPC ................ *A61C 7/20* (2013.01); *C22F 1/006* (2013.01); *A61C 2201/007* (2013.01)

(58) Field of Classification Search
CPC ....... A61C 7/20; A61C 2201/007; A61C 7/12; C22F 1/006
See application file for complete search history.

(56) References Cited

U.S. PATENT DOCUMENTS 5,092,941 A * 3/1992 Miura ...................... A61C 7/00
                                                     148/563
5,683,245 A * 11/1997 Sachdeva ................. A61C 7/20
                                                      433/20
5,843,244 A * 12/1998 Pelton ..................... C22F 1/006
                                                     148/563

(Continued)

FOREIGN PATENT DOCUMENTS

EP      3370638 B1    8/2020
WO   WO1998002109 A2 *  1/1998   ............... A61C 5/42

OTHER PUBLICATIONS

European Search Report from the corresponding European Patent Application No. EP 21 20 6150, dated Apr. 29, 2022.

*Primary Examiner* — Michael W Hotchkiss
(74) *Attorney, Agent, or Firm* — Greer, Burns & Crain, Ltd.; Steven P. Fallon

(57) ABSTRACT

Process for programming an orthodontic component from a shape memory material starting from an initial shape of the orthodontic component into a target shape to be programmed of the orthodontic component, wherein the target shape compared to the initial shape at least sectionally has a severe bending, the process comprising the following steps:
  a. providing an orthodontic component (1) of a shape memory material in an initial shape,
  b. creating a target baking mold for the orthodontic component (1),
  c. inserting the orthodontic component (1) into the target baking mold, and
  d. baking the orthodontic component (1) in the target baking mold in order to program it into the target shape, characterized by the following steps after step a)
  e. creating at least one intermediate baking mold for the orthodontic component (1), in which intermediate baking mold the orthodontic component (1) has an intermediate shape between the initial shape and the target shape,
  f. inserting the orthodontic component (1) into the intermediate baking mold, and
  g. baking the orthodontic component (1) in the intermediate baking mold.

7 Claims, 4 Drawing Sheets

(56) References Cited

U.S. PATENT DOCUMENTS

Figure 1:
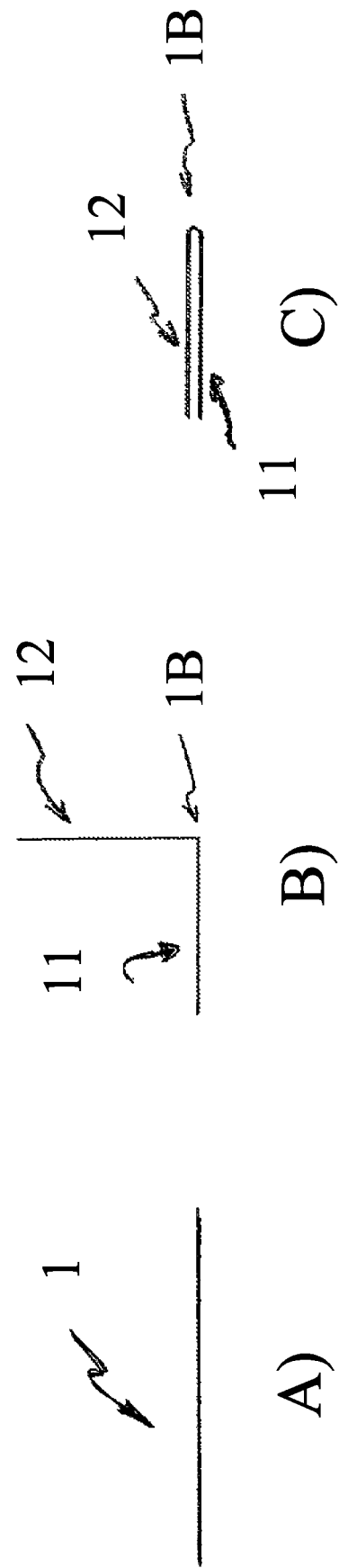

| | | | | |
|---|---|---|---|---|
| 6,293,791 | B1* | 9/2001 | Weinstein | A61C 7/04 |
| | | | | 433/4 |
| 6,928,733 | B2* | 8/2005 | Rubbert | A61C 7/20 |
| | | | | 29/407.04 |
| RE44,668 | E* | 12/2013 | Rubbert | B33Y 50/00 |
| | | | | 703/2 |
| 10,217,237 | B1* | 2/2019 | Goncharov | B21F 1/00 |
| 11,000,741 | B2* | 5/2021 | Khan | B23K 26/14 |
| 2007/0154859 | A1* | 7/2007 | Hilliard | A61C 7/20 |
| | | | | 433/20 |
| 2008/0254403 | A1* | 10/2008 | Hilliard | A61C 7/20 |
| | | | | 433/24 |
| 2011/0083767 | A1* | 4/2011 | Johnson | C30B 33/02 |
| | | | | 140/71 R |
| 2012/0048432 | A1* | 3/2012 | Johnson | C22F 1/08 |
| | | | | 148/563 |
| 2014/0154637 | A1 | 6/2014 | Hansen et al. | |
| 2014/0209219 | A1* | 7/2014 | Johnson | C22F 1/006 |
| | | | | 148/562 |
| 2014/0234794 | A1 | 8/2014 | Vu | |
| 2018/0206941 | A1* | 7/2018 | Lee | A61C 7/002 |
| 2020/0315747 | A1 | 10/2020 | Lai et al. | |
| 2022/0133438 | A1* | 5/2022 | Wratten, Jr. | A61C 7/145 |
| | | | | 433/8 |

* cited by examiner

PROCESS TO PROGRAM AN ORTHODONTIC COMPONENT FROM A SHAPE MEMORY MATERIAL

This application claims the priority of German patent application 10 2020 214 587.3, filed on 19 Nov. 2020.

The invention relates to a process for programming an orthodontic component from a shape memory material, and to an orthodontic component programmed according to the process.

Orthodontic treatment of patients with a removable appliance is advantageous for low-grade malpositions, while more difficult treatments often require the use of fixed appliances. Removable appliances usually consist of an individually laboratory-made plastic base having clasps and corrective elements made of stainless steel wire, some of which are also equipped with orthodontic screws. By these braces, the position of crooked teeth, the width of dental arches and the position of incorrectly positioned jaws, among other things, can be corrected.

Orthodontic components of removable appliances can also be a spring, a wire section as a labial arch, or a protrusion spring, a retaining element, or a U-bow. These elements can consist of steel, in particular stainless steel. Alternatively, however, these elements can also consist of a shape memory material.

During an orthodontic treatment of a patient with fixed braces, orthodontic wires made of a shape memory material are commonly inserted into the brackets at the beginning of the treatment in order to achieve a "rough" alignment of the teeth. Only towards the end of the orthodontic treatment, e.g. steel wires are used to move the teeth as precisely as possible into a defined position.

For the orthodontic treatment of a patient, it is necessary to transfer the orthodontic components from an initial shape, in which they are provided to the orthodontist or to a dental laboratory, into a desired target shape, so that a defined or resp. desired force is exerted by them onto one tooth or also onto more teeth in order to move it or them in a specific direction.

It is known to transfer orthodontic components, e.g. U-bows or labial arches for a removable appliance, made of steel into a desired target geometry with the aid of pliers in order to exert a desired force onto one or more teeth.

This does not work with orthodontic wires made of a shape memory material, as they do not exhibit a conventional behavior of elasticity when deformed. There are procedures in which bending robots are used to bend them into a desired target shape. The bending robot receives the necessary data for bending the orthodontic wire from an orthodontist's planning software, in which a patient's teeth with associated brackets are virtually present and for a specific treatment step the course of the orthodontic arch is automatically calculated and is then exported to the bending robot.

The most important shape memory materials include Cu—Zn—X (X: Si, Sn, Al) alloys and the intermetallic NiTi alloy (nickel content of approx. 55 wt.-%), wherein the NiTi alloy has been able to achieve a greater technological significance due to more favorable properties. The shape memory effect is based on a thermoelastic martensite transformation, a reversible phase transformation caused by shearing of the lattice planes. The cooling of the high-temperature phase, called austenite, below the alloy-specific martensite starting temperature leads to the phase transformation without shape change and without irreversible plastic deformation, as is the case with steels.

Shape memory alloys are easily deformed in the martensitic state; the reversible deformation can be up to 8% for NiTi. This deformation is permanent as long as the alloy is in the martensitic state. The heating above the alloy-specific austenite starting temperature then results in the recovery of the original shape.

In order to program an orthodontic component from a shape memory material into a target geometry, it is brought into the desired target geometry in a special baking mold and is then heated to a transition temperature specific to the shape memory material. Subsequently, the orthodontic component is cooled again and is inserted with deformation into an orthodontic appliance of a patient. In the patient's mouth, the orthodontic component is warmed again and remembers its target geometry, to which it then attempts to deform back. During this deformation, the orthodontic component exerts a force onto brackets or resp. teeth in order to move them in a specific direction.

The parameters to be used for programming an orthodontic component, such as e.g. transition temperature, duration of the programming procedure, etc., depend on the shape memory material and are determined by the manufacturer of the shape memory material or by the manufacturer of the orthodontic component and are communicated to the user, e.g. to the orthodontist or to the dental laboratory, upon request.

When an orthodontic component made of a shape memory material is bent from an initial shape into a target shape (and is programmed in this way, if necessary) and when therein a severe bending of the orthodontic component occurs during the transition from the initial shape into the target shape (beyond a maximum bending angle), it so happens that the shape memory material is plastically deformed in the area of the severe bending and/or becomes brittle in this section. Both result in that the material behavior in the section changes in an unfavorable manner and the orthodontic component no longer exerts the desired force in the orthodontic appliance.

The maximum bending angles depend on various parameters of the orthodontic component: firstly its geometric shape and secondly on the shape memory material of which the orthodontic component is made. However, the maximum bending angles also depend on the bending direction around which the orthodontic component, e.g. the orthodontic wire, is to be bent. If the orthodontic component e.g. has a rectangular cross-section, it makes a difference whether the orthodontic component is to be bent around the narrow or resp. thin, or around the wide or resp. thick side of the rectangle.

In the context of the present application, the term severe bending means a bending of the orthodontic component that exceeds elastic deformation. In other words, the orthodontic component made of a shape memory material is bent to an extent that a plastic deformation occurs in the area of the severe bending and/or the material becomes brittle in the area of the severe bending.

US 2014/0234794 A1 discloses a process for deforming an orthodontic wire made of a shape memory material into a target geometry for fitting insertion into a patient-specific appliance, in particular into fixed brackets which are arranged on a patient's teeth. In this process, a patient-specific target set-up of the patient's upper or lower jaw in question is first created. Subsequently, brackets are placed on the teeth to be treated in the target set-up. A two-dimensional image is created from the top view onto the respective target set-up, e.g. a photo is created in the top view of the target set-up. This two-dimensional image is loaded into a data processing system and the location of the slot is identified for each bracket. The thus obtained data on the position of the slots is exported from the data processing system in order to create, e.g. to mill from an aluminum plate, a baking mold for an orthodontic wire made of a shape memory material. In this process, wire fixing sections in the baking mold are generated with aid of the data, which wire fixing sections hold the wire during baking in the areas corresponding to the slots. The orthodontic wire to be programmed is subsequently inserted into the baking mold, and is baked in order to program it into the target geometry. The orthodontic wire is thus programmed from its initial geometry into the target geometry in a single process step, i.e. is programmed directly and immediately into its target geometry. Accordingly, the physical limits applicable to the respective wire, depending on the diameter of the wire as well as on the degree of deformation/bending, must be considered during programming into the target geometry and form the limits for programming the wire.

EP 3370638 B1 is based on the treatment of an orthodontic malposition by means of aligners: Several intermediate positions are calculated between a CURRENT position of the teeth of a jaw and a corresponding TARGET position of the teeth in the respective jaw. A treatment splint is then created for each intermediate position and the patient wears the treatment splint created for each intermediate position in ascending order to move the teeth from the CURRENT position through the respective intermediate positions to the TARGET position. By EP 2270638 B1, the previous multiple treatment splints are to be replaced by a single treatment splint. For this purpose, the, according to the invention, one treatment splint, which is made of a shape memory polymer, is programmed at different temperatures with the aid of e.g. ionizing radiation on different intermediate models corresponding to the intermediate positions. The patient then wears the one treatment splint and heats it—at the end of each treatment step corresponding to the respective intermediate positions—to increasingly higher temperatures, whereby more and more crystalline structures of the one treatment splint are destroyed and the treatment splint is programmed for the then following next treatment step, corresponding to the next intermediate position.

The programming of the one treatment splint of EP 3370638 B1 thus starts with the programming in the target position and ends with the CURRENT position, i.e. in reverse order to the treatment. This reverse order of programming is possible because there are no limits of the shape memory polymer to be considered during programming.

In contrast, namely, to US 2014/0234794 A1, which has to consider the physical limits of the orthodontic wire during deformation into the target geometry, in EP 3370638 B1 it is possible to program the treatment splint directly into the target geometry because the shape memory polymer knows no physical limits, since the crystalline structure of the treatment splint can be programmed, resp. destroyed as desired.

The methods described in EP 3370638 B1 for programming shape memory polymers are also not transferable to shape memory materials made of metal: Firstly, the processes themselves are unsuitable, e.g. ionizing radiation. Secondly, in the process described above, crystalline structures of the shape memory polymer of the treatment splint are gradually destroyed, whereby the treatment splint itself is incrementally destroyed.

OBJECT OF THE INVENTION

The present invention has the object to provide a process for deforming an orthodontic component made of a shape memory material, in which an unfavorable change in the material behavior is reduced or avoided even in the case of severe bendings.

DESCRIPTION OF THE INVENTION

According to the invention, the object is achieved by a process having the features of claim 1, which process leads to an associated orthodontic component according to its independent claim.

In step 1a), an orthodontic wire for insertion into a slot of a bracket, a spring, a wire section as a labial arch or a protrusion spring of a removable appliance, a retaining element of a removable appliance, or a U-bow of a removable appliance can be provided as an orthodontic component. In a first embodiment, in step 1e) an intermediate baking mold is created by which steps 1f) and 1g) are carried out.

In a second embodiment, in step 1e) a first intermediate baking mold is created by which steps 1f) and 1g) are carried out, and a second intermediate baking mold is created by which steps 1f) and 1g) are subsequently carried out.

In a third embodiment, in step 1e) a first intermediate baking mold is created by which steps 1f) and 1g) are carried out, and a second intermediate baking mold is created by which steps 1f) and 1g) are subsequently carried out, and a third intermediate baking mold is created by which steps 1f) and 1g) are subsequently carried out.

When an intermediate baking mold is used, preferably half of the severe bending is carried out by the intermediate baking mold and the other half of the severe bending is carried out by the target baking mold. When two intermediate baking molds are used, preferably one third of the severe bending is carried out by each of the first and second intermediate baking molds and the third third of the severe bending is carried out by the target baking mold. When three intermediate baking molds are used, preferably the first as well as the second as well as the third intermediate baking mold is used to carry out one quarter of the severe bending each, and the target baking mold is used to carry out the fourth quarter of the severe bending.

As an alternative to the even distribution of the severe bending among the various baking molds, it is possible to distribute the severe bending among the respective baking molds into differently sized bendings. For example, a predominant or significant portion of the severe bending can be carried out by the first intermediate baking mold, and only a small or insignificant portion of the severe bending can be carried out by the target baking mold. Furthermore, e.g. only a small or insignificant portion of the severe bending can be carried out by the first intermediate baking mold and a predominant or significant portion of the severe bending can be carried out by the target baking mold.

When only one intermediate baking mold is used, preferably between 50 and 90% of the severe bending is carried out by the intermediate baking mold, and 50 to 10% of the severe bending are carried out by the target baking mold. When two intermediate baking molds are used, of the severe bending preferably 20-70% are carried out by the first intermediate baking mold, 20-50% by the second intermediate baking mold and 10-40% by the target baking mold. When three intermediate baking molds are used, of the severe bending preferably 20-70% are carried out by the first intermediate baking mold and 10-40% by the second intermediate baking mold and 10-40% by the third intermediate baking mold and 10-40% by the target baking mold.

Figure 2:
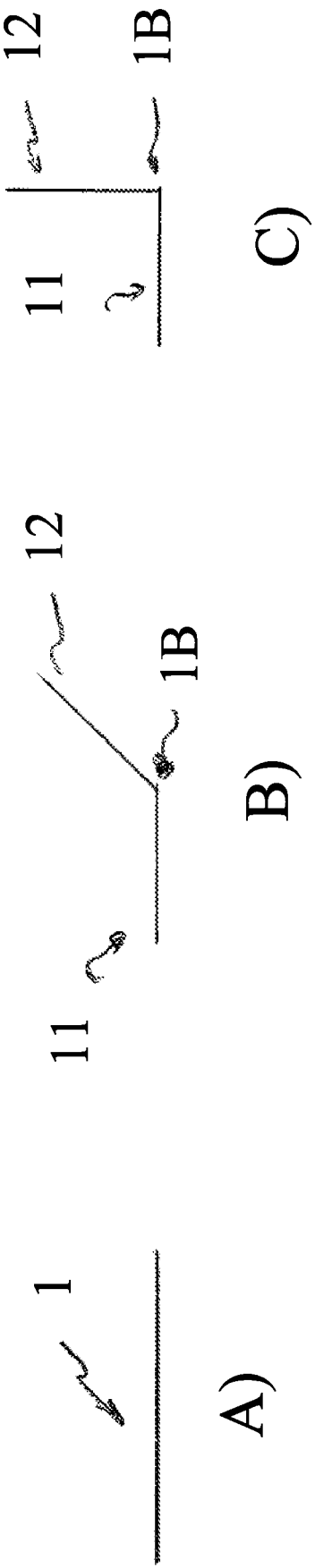
Figure 3:
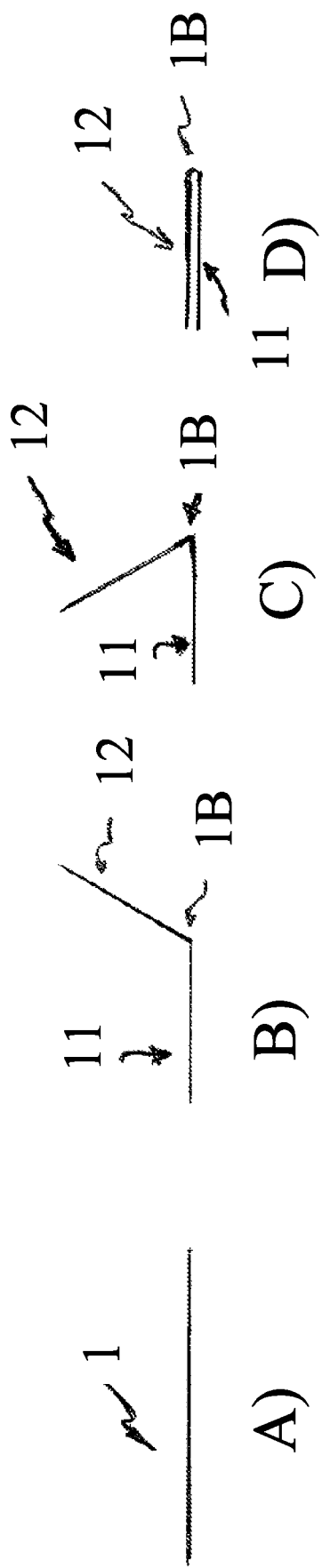
Figure 4:
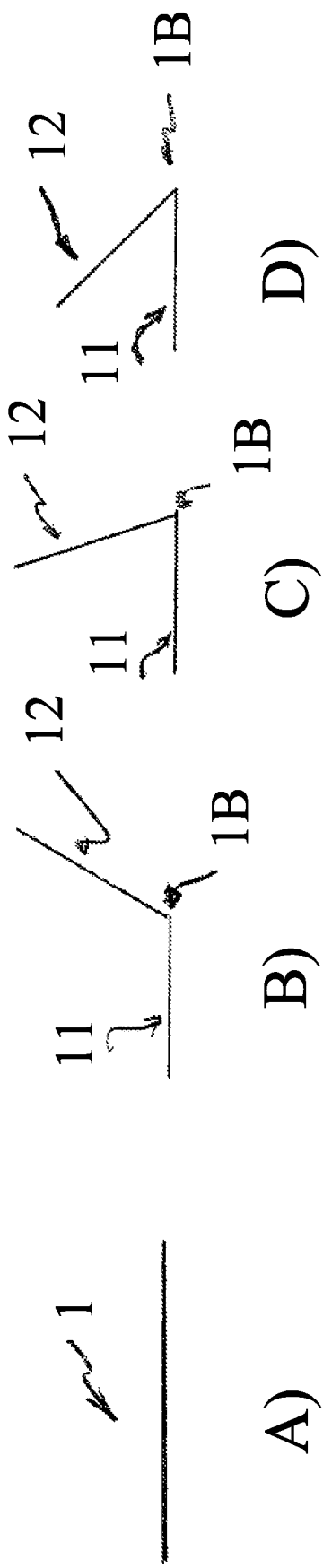

Further features, details and advantages of the invention are apparent from the claims and the following description of preferred embodiments and from the drawing. It is shown in:

FIGS. 1 A), B) and C) a schematic representation of an orthodontic wire,

FIGS. 2 A), B) and C) a schematic representation of an orthodontic wire in various process steps of the process according to the invention in a first embodiment, FIGS. 3 A), B), C) and D) a schematic representation of an orthodontic wire in various process steps of the process according to the invention in a second embodiment, and FIGS. 4 A), B), C) and D) a schematic representation of an orthodontic wire in various process steps of the process according to the invention in a third embodiment.

FIG. 1A) schematically shows an orthodontic wire 1 as it is present in an orthodontic practice or in a dental laboratory. The orthodontic wire is shown in its initial shape: it is formed linearly, resp. straight and has a length and cross-section typical for an orthodontic wire. The orthodontic wire 1 is formed of a shape memory material.

The orthodontic wire is intended for use as an orthodontic component in a removable appliance, e.g. as labial arch, protrusion spring, retaining element or U-bow.

Starting from the initial shape shown in FIG. 1A), bendings are to be made on the orthodontic wire 1 for this purpose in order to insert it in a patient-specific manner into a removable appliance of a patient, wherein the orthodontic wire 1 is previously programmed to a specific target shape.

The necessary process parameters for baking the orthodontic wire 1 are typically provided by the manufacturer and/or supplier of the orthodontic wire 1 upon request.

In order to program the orthodontic wire 1 into a target shape, the following steps are carried out: Creating a target baking mold for the orthodontic wire, inserting the orthodontic wire into the target baking mold, and baking the orthodontic wire in the target baking mold to program it into the target shape, FIG. 1B) shows a schematic representation of the orthodontic wire 1 of FIG. 1A), wherein the orthodontic wire 1 has a bending 1B between a first section 11 and a second section 12 of the orthodontic wire 1. The bending 1B is carried out as a 90° bending.

FIG. 1C) shows a schematic representation of the orthodontic wire 1 of FIG. 1A), wherein the orthodontic wire 1 has a bending 1B between a first section 11 and a second section 12 of the orthodontic wire 1. The bending 1B is carried out as a 180° bending.

FIGS. 1B) and C) show bendings 1B of the orthodontic wire of 90° and 180°, respectively, which are severe bendings for most orthodontic wires.

The orthodontic wires 1 of FIGS. 1B) and 1C) in the shape as shown are obviously not suitable for the insertion into a patient's orthodontic appliance. However, this simplified illustration of an orthodontic wire 1 having only one bending 1B is sufficient for the purpose of explaining the principles of the present invention, since, obviously, multiple bendings 1B and bendings 1B of varying degrees can be made in the orthodontic wire 1 in order to transfer it into a target shape as it is required for a patient's fixed brace.

With reference to FIG. 2, a first embodiment of the process according to the invention is described below.

FIG. 2A) shows the orthodontic wire 1 in its initial shape in which it is provided by the manufacturer. The orthodontic wire 1 is to be transferred into a target shape having a 90° bending in order to e.g. be used as a labial arch in a removable appliance, although this would of course require further bendings. In single-phase programming of the orthodontic wire 1, this would be plastically deformed during direct transfer into the target shape. Bending tests by the treating orthodontist or also by the dental laboratory have experimentally shown that plastic deformation occurs in the wire 1 in the area of the bending, starting from a bending of 60°.

In a next step, the orthodontic wire 1 of FIG. 2A) is inserted into an intermediate baking mold, which is not shown, and in this is baked and subsequently cooled.

The result of this step is shown in FIG. 2B): the orthodontic wire 1 has a bending 1B of 45° between a first section 11 and a second section 12.

In a next step, the orthodontic wire 1 of FIG. 2B) is placed in a target baking mold, which is not shown, and in this is baked and subsequently cooled. The result of this step is shown in FIG. 2C): the orthodontic wire 1 has a bending 1B of 90° between the first section 11 and the second section 12.

In order to avoid the severe bending of the orthodontic wire 1 from 0° in the initial shape of FIG. 2A) to 90° in the target shape of FIG. 2C) in one step, the orthodontic wire 1 in an intermediate baking mold is provided with a bending of 45° according to FIG. 2B) and is only transferred from this shape of FIG. 2B) to the target shape of FIG. 2C) with the aid of the target baking mold. In this way, the severe bending of 90° was avoided.

With reference to FIG. 3, a second embodiment of the process according to the invention is described.

FIG. 3A) shows the orthodontic wire 1 in its initial shape in which it is provided by the manufacturer. The orthodontic wire 1 is to be transferred into a target shape having a 180° bending in order to e.g. be used as a U-bow in a removable appliance, although this would of course require further bendings. In single-phase programming of the orthodontic wire 1, this would be plastically deformed during direct transfer into the target shape. Bending tests by the treating orthodontist or also by the dental laboratory have experimentally shown that plastic deformation occurs in the wire 1 in the area of the bending, starting from a bending of 80°.

In a next step, the orthodontic wire 1 of FIG. 3A) is inserted into an intermediate baking mold, which is not shown, and in this is baked and subsequently cooled.

The result of this step is shown in FIG. 3B): the orthodontic wire 1 has a bending 1B of 60° between a first section 11 and a second section 12.

In a next step, the orthodontic wire 1 of FIG. 3B) is placed into another intermediate baking mold, which is not shown, and in this is baked and subsequently cooled. The result of this step is shown in FIG. 3C): the orthodontic wire 1 has a bending 1B of 120° between the first section 11 and the second section 12.

In a next step, the orthodontic wire 1 of FIG. 3C) is placed into a target baking mold, which is not shown, and in this is baked and subsequently cooled. The result of this step is shown in FIG. 3D): the orthodontic wire 1 has a bending 1B of 180° between the first section 11 and the second section 12.

In order to avoid the severe bending of the orthodontic wire 1 from 0° in the initial shape of FIG. 3A) to 180° in the target shape of FIG. 3D) in one step, the orthodontic wire 1 in the first intermediate baking mold is provided with a bending of 60° according to FIG. 3B) and in the second intermediate baking mold is provided with a bending of further 60° according to FIG. 3C) to 120° and is only transferred from this shape of FIG. 3C) to the target shape of FIG. 3D) with the aid of the target baking mold. In this embodiment, the total bending of 180° is evenly divided into three bendings of 60° each.

With reference to FIG. 4, a third embodiment of the process according to the invention is described.

FIG. 4A) shows the orthodontic wire 1 in its initial shape, as it is provided by the manufacturer. The orthodontic wire 1 is to be transferred into a target shape having a 135° bending in order to e.g. be used as a retaining element in a removable appliance, although this would of course require further bendings. In single-phase programming of the orthodontic wire 1, this would be plastically deformed during direct transfer into the target shape. Bending tests by the treating orthodontist or also by the dental laboratory have experimentally shown that plastic deformation occurs in the wire 1 in the area of the bending, starting from a bending of 70°.

In a next step, the orthodontic wire 1 of FIG. 4A) is inserted into an intermediate baking mold, which is not shown, and in this mold is baked and subsequently cooled.

The result of this step is shown in FIG. 4B): the orthodontic wire 1 has a bending 1B of 60° between a first section 11 and a second section 12.

In a next step, the orthodontic wire 1 of FIG. 4B) is placed into another intermediate baking mold, which is not shown, and in this is baked and subsequently cooled.

The result of this step is shown in FIG. 4C): the orthodontic wire 1 has a bending 1B of 110° between the first section 11 and the second section 12.

In a next step, the orthodontic wire 1 of FIG. 4C) is placed into a target baking mold, which is not shown, and in this is baked and subsequently cooled.

The result of this step is shown in FIG. 4D): the orthodontic wire 1 has a bending 1B of 135° between the first section 11 and the second section 12.

In order to avoid the severe bending of the orthodontic wire 1 from 0° in the initial shape of FIG. 4A) to 135° in the target shape of FIG. 4D) in one step, the orthodontic wire 1 in a first intermediate baking mold is provided with a bending of 60° according to FIG. 4B) and in a second intermediate baking mold is provided with a bending of a further 50° according to FIG. 4C) to 110° and is only transferred from this shape of FIG. 4C) into the target shape of FIG. 4D) with the aid of the target baking mold. In this embodiment, the total bending of 135° is unevenly divided into three bendings of 60° and then 50° and then 25° in the respective baking molds.

LIST OF REFERENCE SIGNS 1 orthodontic wire
11 first section of the orthodontic wire
12 second section of the orthodontic wire
1B bending

The invention claimed is:

1. A process for programming an orthodontic component from a shape memory material starting from an initial shape of the orthodontic component into a target shape to be programmed of the orthodontic component, wherein the target shape compared to the initial shape at least sectionally has a severe bending, the process comprising the following steps: providing an orthodontic component of a shape memory material in an initial shape, creating a first intermediate baking mold defining a first intermediate shape of the orthodontic component, wherein the first intermediate shape defines a first portion of an angle of the severe bending, inserting the orthodontic component into the intermediate baking mold to impart the first intermediate shape, creating a target baking mold for the orthodontic component, wherein the target baking mold defines a completed form of the angle of the severe bending, inserting the orthodontic component into the target baking mold, and baking the orthodontic component in the target baking mold to program it into the target shape, wherein the first intermediate mold imparts between 25 and 90% of the severe bending.

2. The process according to claim 1, wherein the orthodontic component is one of an orthodontic wire for insertion into a slot of a bracket, a spring, a wire section of a labial arch, a protrusion spring of a removable appliance, a retaining element of a removable appliance, or a U-bow of a removable appliance.

3. The process according to claim 1, wherein the first portion of the angle of severe bending is half of the severe bending.

4. The process according to claim 1, comprising: creating a second intermediate baking mold for defining a second intermediate shape of the orthodontic component after the first intermediate shape has been imparted, wherein the second intermediate shape defines a second portion of the angle of the severe bending that is larger than the first portion of the angle of the severe bending, inserting the orthodontic component into the second intermediate baking mold, and baking the orthodontic component in the second intermediate baking mold to impart the second intermediate shape.

5. The process according to claim 4, wherein the first portion of the angle of severe bending is one third of the severe bending and the second portion of the angle of severe bending is two thirds of the severe bending.

6. The process according to claim 4, comprising: creating a third intermediate baking mold defining a third intermediate shape of the orthodontic component after the second intermediate shape has been imparted, wherein the third intermediate shape defines a third portion of the angle of the severe bending that is larger than the second portion of the angle of the severe bending, inserting the orthodontic component into the third intermediate baking mold, and baking the orthodontic component in the third intermediate baking mold to impart the third intermediate shape.

7. The process according to claim 6, wherein the first portion of the angle of severe bending is one quarter of the severe bending and the second portion of the angle of severe bending is two quarters of the severe bending, and the third portion of the angle of the severe bending is three quarters of the severe bending.

* * * * *